United States Patent
Hsieh et al.

(10) Patent No.: US 9,056,526 B2
(45) Date of Patent: Jun. 16, 2015

(54) MODIFIED COPOLYMER OF CONJUGATED DIENE AND VINYL AROMATIC HYDROCARBON AND POLYMERIZATION METHOD THEREOF

(71) Applicant: Chi Mei Corporation, Tainan (TW)

(72) Inventors: Kuan-Lin Hsieh, Tainan (TW);
Kuei-Lun Cheng, Tainan (TW);
Chih-Cheng Lee, Tainan (TW)

(73) Assignee: Chi Mei Corporation, Tainan (TW)

( * ) Notice: Subject to any disclaimer, the term of this patent is extended or adjusted under 35 U.S.C. 154(b) by 84 days.

(21) Appl. No.: 13/961,855

(22) Filed: Aug. 7, 2013

(65) Prior Publication Data

US 2014/0187720 A1    Jul. 3, 2014

(30) Foreign Application Priority Data

Dec. 28, 2012 (TW) .............................. 101151056 A

(51) Int. Cl.
*B60C 1/00* (2006.01)
*C08F 2/00* (2006.01)
*C08F 293/00* (2006.01)
*C08C 19/44* (2006.01)
*C08L 15/00* (2006.01)

(52) U.S. Cl.
CPC ............... *B60C 1/00* (2013.01); *B60C 1/0016* (2013.04); *C08F 2/00* (2013.01); *C08F 293/005* (2013.01); *C08C 19/44* (2013.01); *C08L 15/00* (2013.01)

(58) Field of Classification Search
None
See application file for complete search history.

(56) References Cited

U.S. PATENT DOCUMENTS

| | | | | |
|---|---|---|---|---|
| 5,290,878 | A | * | 3/1994 | Yamamoto et al. ......... 525/332.2 |
| H1730 | H | * | 5/1998 | Sutherland .................... 525/299 |
| 8,895,665 | B2 | * | 11/2014 | Lee et al. ...................... 525/105 |
| 2011/0130499 | A1 | * | 6/2011 | Nicolini et al. ............... 524/139 |
| 2011/0319519 | A1 | | 12/2011 | Sone et al. |

FOREIGN PATENT DOCUMENTS

| | | |
|---|---|---|
| CN | 101903409 | 12/2010 |
| CN | 102348748 | 2/2012 |
| JP | 03-079606 | 4/1991 |
| JP | 2011219701 | 11/2011 |
| WO | 2010131646 | 11/2010 |

OTHER PUBLICATIONS

Derwent accession No. 2009-F07538 for Korean Patent No. 2008-105554 A, Choi et al., Dec. 4, 2008, two pages.*

* cited by examiner

*Primary Examiner* — Robert Sellers
(74) *Attorney, Agent, or Firm* — Jianq Chyun IP Office

(57) ABSTRACT

Provided is a polymerization method of a modified copolymer of conjugated diene and vinyl aromatic hydrocarbon. A multi-functional vinyl benzene-based compound is reacted with an organic alkali metal compound to form a star shaped compound with multiple active sites. A conjugated diene monomer, a vinyl aromatic hydrocarbon monomer, and the star shaped compound with multiple active sites are reacted with each other to form a copolymer of conjugated diene and vinyl aromatic hydrocarbon. The copolymer of conjugated diene and vinyl aromatic hydrocarbon is then reacted with a modifier to form the modified copolymer of conjugated diene and vinyl aromatic hydrocarbon.
The modifier is represented by formula 1,

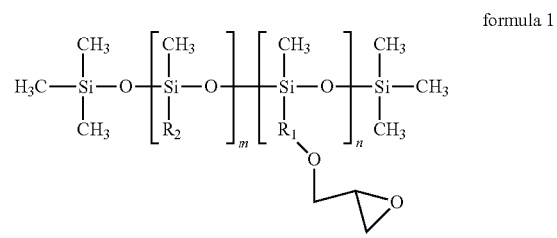

formula 1 wherein $R_1$ is a $C_2$-$C_4$ alkylene group; $R_2$ is a group at least consisting of a $C_2$-$C_4$ alkylene group and a $C_1$-$C_3$ alkoxy group; m is an integer of 5 to 30; and n is an integer of 5 to 35.

20 Claims, No Drawings

MODIFIED COPOLYMER OF CONJUGATED DIENE AND VINYL AROMATIC HYDROCARBON AND POLYMERIZATION METHOD THEREOF

CROSS-REFERENCE TO RELATED APPLICATION

This application claims the priority benefit of Taiwan application serial no. 101151056, filed on Dec. 28, 2012. The entirety of the above-mentioned patent application is hereby incorporated by reference herein and made a part of this specification.

BACKGROUND OF THE INVENTION

1. Field of Invention

The present invention relates to an alkene polymer and a polymerization method thereof, and particularly to a modified copolymer of conjugated diene and vinyl aromatic hydrocarbon and a polymerization method thereof.

2. Description of Related Art

A modified copolymer of conjugated diene and vinyl aromatic hydrocarbon can be used as a material for manufacturing tires. For tires, rolling resistance and wet skid resistance are crucial factors to save energy consumption and increase driving safety. Currently, carbon black is added to the modified copolymer of conjugated diene and vinyl aromatic hydrocarbon to increase the strength of the tires.

In recent years, due to the depletion of oil resource and the global warming issue, the tire industry replaces carbon black with white carbon (main component thereof is silica) with an aim of improving the rolling resistance of the tires and therefore reducing energy loss. In comparison with carbon black, silica is more difficult to be uniformly distributed in a modified copolymer of conjugated diene and vinyl aromatic hydrocarbon. Therefore, compatibility and mixing homogeneity between silica and a modified copolymer of conjugated diene and vinyl aromatic hydrocarbon need to be further improved.

SUMMARY OF THE INVENTION

Accordingly, the present invention is directed to a modified copolymer of conjugated diene and vinyl aromatic hydrocarbon and a polymerization method thereof. The synthesized modified copolymer of conjugated diene and vinyl aromatic hydrocarbon is highly compatible with silica and suitable for manufacturing tires with excellent performance in wet skid resistance and rolling resistance.

The present invention provides a polymerization method of a modified copolymer of conjugated diene and vinyl aromatic hydrocarbon including the following steps. First, a multi-functional vinyl benzene-based compound is reacted with an organic alkali metal compound to form a star-shaped compound with multiple active sites. Next, a conjugated diene monomer, a vinyl aromatic hydrocarbon monomer, and the star-shaped compound with multiple active sites are reacted to form a copolymer of conjugated diene and vinyl aromatic hydrocarbon, wherein a weight ratio of the conjugated diene monomer to the vinyl aromatic hydrocarbon monomer is 2:1 to 6:1. Then, the copolymer of conjugated diene and vinyl aromatic hydrocarbon is reacted with a modifier to form a modified copolymer of conjugated diene and vinyl aromatic hydrocarbon, wherein the modifier is a compound represented by formula 1,

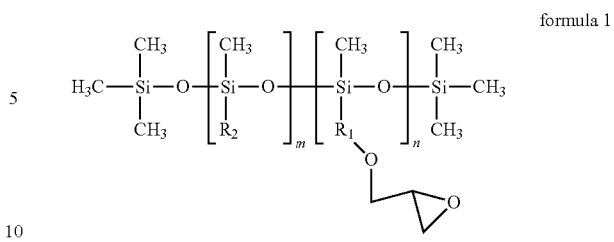

formula 1 wherein $R_1$ is a $C_2$-$C_4$ alkylene group; $R_2$ includes a $C_2$-$C_4$ alkylene group and a $C_1$-$C_3$ alkoxy group; m is an integer of 5 to 30; and n is an integer of 5 to 35. In an embodiment, $R_2$ may include the $C_2$-$C_4$ alkylene group, a (O—$C_2H_4$) group, a (O—CH(CH$_3$)CH$_2$) group and the $C_1$-$C_3$ alkoxy group. In another embodiment, $R_2$ may also be —(CH$_2$)$_3$—(O—C$_2$H$_4$)$_p$—(O—CH(CH$_3$)CH$_2$)$_q$—OR$_3$, wherein $R_3$ is hydrogen or a $C_1$-$C_6$ alkyl group; and each of p and q is integer of 2 to 30. Besides, based on 100 parts by weight of a total amount of the conjugated diene monomer and the vinyl aromatic hydrocarbon monomer, an amount of the multi-functional vinyl benzene-based compound is 0.01 to 0.1 part by weight, an amount of the organic alkali metal compound is 0.001 to 0.1 part by weight, and an amount of the modifier amounts is 0.01 to 0.8 part by weight.

According to an embodiment of the present invention, based on 100 parts by weight of the total amount of the conjugated diene monomer and the vinyl aromatic hydrocarbon monomer, the amount of the multi-functional vinyl benzene-based compound is 0.02 to 0.09 part by weight, the amount of the organic alkali metal compound is 0.005 to 0.05 part by weight, and the amount of the modifier is 0.03 to 0.6 part by weight.

According to an embodiment of the present invention, based on 100 parts by weight of the total amount of the conjugated diene monomer and the vinyl aromatic hydrocarbon monomer, the amount of the multi-functional vinyl benzene-based compound is 0.03 to 0.08 part by weight, the amount of the organic alkali metal compound is 0.01 to 0.03 part by weight, and the amount of the modifier is 0.03 to 0.6 part by weight.

According to an embodiment of the present invention, the number of the active sites of the star-shaped compound with multiple active sites is 2.0 to 4.0, preferably 2.5 to 4.0, and more preferably 3.0 to 3.8.

According to an embodiment of the present invention, the multi-functional vinyl benzene-based compound includes 50 wt % to 80 wt % of meta-divinylbenzene and 20 wt % to 50 wt % of para-divinylbenzene.

According to an embodiment of the present invention, the organic alkali metal compound includes ethyl lithium, n-propyl lithium, isopropyl lithium, n-butyl lithium, n-pentyl lithium, phenyl lithium, tolyl lithium or a combination thereof.

According to an embodiment of the present invention, the polymerization method further includes adding a micro-structure modifier during the step of reacting the multi-functional vinyl benzene-based compound with the organic alkali metal compound to form the star-shaped compound with multiple active sites, wherein based on 100 parts by weight of the total amount of the conjugated diene monomer and the vinyl aromatic hydrocarbon monomer, an amount of the micro-structure modifier is 0.05 to 0.5 part by weight.

According to an embodiment of the present invention, the micro-structure modifier includes at least one compound selected from an ether, a tertiary amine compound, an alkali metal alkoxylate compound, a phosphine compound, an alkyl compound and an aryl sulfonic acid compound.

According to an embodiment of the present invention, the conjugated diene monomer accounts for 74 wt % to 84 wt % and the vinyl aromatic hydrocarbon monomer accounts for 16 wt % to 26 wt % based on the total amount of the conjugated diene monomer and the vinyl aromatic hydrocarbon monomer.

According to an embodiment of the present invention, the conjugated diene monomer includes 1,3-butadiene, isoprene, 1,3-pentadiene, 2-ethyl-1,3-butadiene, 2,3-dimethyl-butadiene, 2-methyl-pentadiene, 4-methyl-pentadiene, 2,4-hexadiene or a combination thereof, and the vinyl aromatic hydrocarbon monomer includes styrene, α-methylstyrene or a combination thereof.

The present invention further provides a modified copolymer of conjugated diene and vinyl aromatic hydrocarbon formed by the following polymerization steps. First, a multi-functional vinyl benzene-based compound is reacted with an organic alkali metal compound to form a star-shaped compound with multiple active sites. Next, a conjugated diene monomer, a vinyl aromatic hydrocarbon monomer, and the star-shaped compound with multiple active sites are reacted to form a copolymer of conjugated diene and vinyl aromatic hydrocarbon, wherein a weight ratio of the conjugated diene monomer to the vinyl aromatic hydrocarbon monomer is 2:1 to 6:1. Then, the copolymer of conjugated diene and vinyl aromatic hydrocarbon is reacted with a modifier to form a modified copolymer of conjugated diene and vinyl aromatic hydrocarbon, wherein the modifier is a compound represented by formula 1,

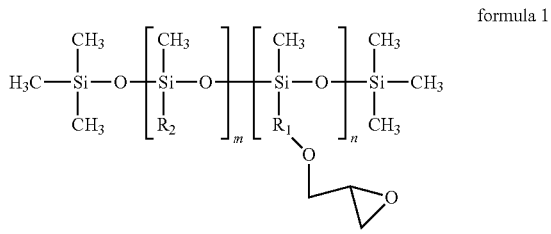

formula 1 wherein $R_1$ is a $C_2$-$C_4$ alkylene group; $R_2$ is a group includes a $C_2$-$C_4$ alkylene group and a $C_1$-$C_3$ alkoxy group; m is an integer of 5 to 30; and n is an integer of 5 to 35. In an embodiment, $R_2$ may include the $C_2$-$C_4$ alkylene group, a (O—$C_2H_4$) group, a (O—CH($CH_3$)$CH_2$) group and the $C_1$-$C_3$ alkoxy group. In another embodiment, $R_2$ may also be —(CH$_2$)$_3$—(O—C$_2$H$_4$)$_p$—(O—CH(CH$_3$)CH$_2$)$_q$—OR$_3$, wherein $R_3$ is hydrogen or a $C_1$-$C_6$ alkyl group; and each of p and q is integer of 2 to 30. Besides, based on 100 parts by weight of a total amount of the conjugated diene monomer and the vinyl aromatic hydrocarbon monomer, an amount of the multi-functional vinyl benzene-based compound is 0.01 to 0.1 part by weight, an amount of the organic alkali metal compound is 0.001 to 0.1 part by weight, and an amount of the modifier is 0.01 to 0.8 part by weight.

In view of the above, the present invention provides a modified copolymer of conjugated diene and vinyl aromatic hydrocarbon and a polymerization method thereof. According to the present invention, the modified copolymer of conjugated diene and vinyl aromatic hydrocarbon is highly compatible with white carbon. Thus, the modified copolymer of conjugated diene and vinyl aromatic hydrocarbon is suitable for manufacturing tires with excellent performance in wet skid resistance and rolling resistance.

In order to make the aforementioned and other objects, features and advantages of the present invention comprehensible, a preferred embodiment accompanied with a scheme is described in detail below.

DESCRIPTION OF EMBODIMENTS

Reference will now be made in detail to the present embodiments to illustrate the modified copolymer of conjugated diene and vinyl aromatic hydrocarbon in the present invention.

In the specification, unless otherwise specified, a functional group may indicate a substituted or unsubstituted functional group. For example, an alkyl group may indicate a substituted or unsubstituted alkyl group.

In the specification, the chemical structure of a compound is sometimes represented by a skeletal formula, in which carbon atoms, hydrogen atoms and carbon-hydrogen bonds could be omitted. However, it should be based on the plotted version when a functional group is clearly depicted in a structure.

In the specification, a unit of the amount of an additive is sometimes represented by "part(s) by weight", which is a common terminology in the field of rubber synthesis, meaning parts (by weight) of the additive per 100 parts (by weight) of rubber (i.e. parts per hundreds of rubber, phr). Herein, the so-called "rubber" refers to a copolymer of conjugated diene and vinyl aromatic hydrocarbon. Besides, in the polymerization part of the specification, the weight of a copolymer of conjugated diene and vinyl aromatic hydrocarbon is regarded as equal to the total weight of a conjugated diene monomer and a vinyl aromatic hydrocarbon monomer. That is, when a unit of the amount of an additive in polymerization is represented by part(s) by weight, the amount of the additive is defined with respect to 100 parts by weight of a copolymer of conjugated diene and vinyl aromatic hydrocarbon or with respect to 100 parts by weight of a total amount of a conjugated diene monomer and a vinyl aromatic hydrocarbon monomer.

According to the present invention, the polymerization method of a modified copolymer of conjugated diene and vinyl aromatic hydrocarbon includes the following steps. First, a multi-functional vinyl benzene-based compound is reacted with an organic alkali metal compound to form a star-shaped compound with multiple active sites. Next, a conjugated diene monomer, a vinyl aromatic hydrocarbon monomer, and the star-shaped compound with multiple active sites are reacted to form a copolymer of conjugated diene and vinyl aromatic hydrocarbon. Then, the copolymer of conjugated diene and vinyl aromatic hydrocarbon is reacted with a modifier to form a modified copolymer of conjugated diene and vinyl aromatic hydrocarbon.

According to the polymerization method provided, the multi-functional vinyl benzene-based compound is reacted with the organic alkali metal compound to form the star-shaped compound with multiple active sites before polymerizing the conjugated diene monomer with the vinyl aromatic hydrocarbon monomer. The star-shaped compound with multiple active sites could serve as a polymerization initiator for the following reaction, so as to promote polymerization of the conjugated diene monomer with the vinyl aromatic hydrocarbon monomer.

The multi-functional vinyl benzene-based compound is a composition consisting of meta-divinylbenzene and para-divinylbenzene, wherein the composition includes 50 wt % to 80 wt % of meta-divinylbenzene and 20 wt % to 50 wt % of para-divinylbenzene. In one embodiment, the multi-functional vinyl benzene-based compound includes 71 wt % of meta-divinylbenzene and 29 wt % of para-divinylbenzene.

The amount of the multi-functional vinyl benzene-based compound is 0.01 to 0.1 part by weight, preferably 0.02 to 0.09 part by weight, and more preferably 0.03 to 0.08 part by weight.

The organic alkali metal compound could be a well-known polymerization initiator for promoting polymerization of the conjugated diene monomer with the vinyl aromatic hydrocarbon monomer, such as ethyl lithium, n-propyl lithium, iso-propyl lithium, n-butyl lithium, n-pentyl lithium, phenyl lithium, tolyl lithium or a combination thereof. The amount of the organic alkali metal compound is 0.001 to 0.1 part by weight, preferably 0.005 to 0.05 part by weight, and more preferably 0.01 to 0.03 part by weight.

The formation of the "star-shaped compound with multiple active sites" and the meaning of "multiple active sites" are illustrated by an embodiment including reactions between para-divinylbenzene and n-butyl lithium. Reactions between meta-divinylbenzene and n-butyl lithium are similar to those between para-divinylbenzene and n-butyl lithium, and the details are not repeated herein. However, the present invention is not limited to the embodiment below. In addition, the reaction scheme I below is for demonstration only, and the stoichiometric coefficients between reactants and products are not balanced. Thus, the reaction scheme I could not be used to limit the amounts of the multi-functional vinyl benzene-based compound and the organic alkali metal compound of the present invention.

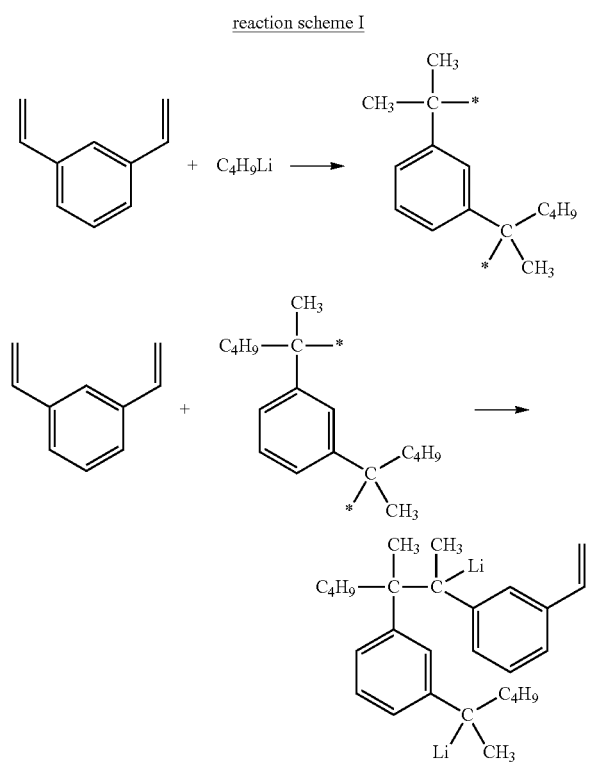

reaction scheme I

First, as shown in the top of the reaction scheme I, para-divinylbenzene is reacted with n-butyl lithium to form a star-shaped compound with two active sites (active sites are represented by "*"). Next, as shown in the middle of the reaction scheme I, the star-shaped compound with two active sites is further reacted with para-divinylbenzene to form a compound with two Li⁺. Then, as shown in the bottom of the reaction scheme I, the compound with two Li⁺ is further reacted with n-butyl lithium to form a star-shaped compound with three active sites. Similarly, the star-shaped compound with four active sites, five active sites, or even more active sites can be obtained by repeating the above-mentioned reaction steps on the star-shaped compound with three active sites. The star-shaped compound has a branched (non-linear) structure rather than a linear structure.

The number of the active sites of the star-shaped compound with multiple active sites is 2.0 to 4.0, preferably 2.5 to 4.0, and more preferably 3.0 to 3.8. In one embodiment, the number of the active sites of the star-shaped compound with multiple active sites is 3.3.

The analysis of the number of the active sites of the star-shaped compound with multiple active sites is performed by using the gel permeation chromatography (GPC, brand name: HP 1100). The analysis is performed in tetrahydrofuran (THF) using 0.1% toluene as an internal standard.

In addition, a micro-structure modifier could be added when the multi-functional vinyl benzene-based compound is reacted with the organic alkali metal compound to form the star-shaped compound with multiple active sites. The conjugated diene monomer and the vinyl aromatic hydrocarbon monomer could be copolymerized randomly in the presence of the micro-structure modifier. The micro-structure modifier could be a polar compound. In one embodiment, the micro-structure modifier may be a vinylating agent or a 1,2-vinyl configuration agent.

The micro-structure modifier could be an ether, such as tetrahydrofuran, diethyl ether, dioxane, ethylene glycol dimethyl ether, ethylene glycol dibutyl ether, diethylene glycol dimethyl ether, diethylene glycol dibutyl ether, dimethoxybenzene, 2,2-ditetrahydrofurylpropane (DTHFP) or the like; a tertiary amine compound, such as tetramethyl ethyl enediamine, dipiperidinoethane, trimethylamine, triethylamine, pyridine, quinuclidine or the like; an alkali metal alkoxylate compound, such as potassium tert-pentoxide, potassium tert-butoxide, sodium tert-butoxide, sodium tert-pentoxide or the like; a phosphine compound, such as triphenylphosphine or the like; an alkyl compound or an aryl sulfonic acid compound or the like.

The micro-structure modifier can either be used alone, or be mixed by two or more kinds of polar compounds. The amount of the micro-structure modifier can be selected upon the actual requirements and its structure modifying effect. Based on 100 parts by weight of the total amount of the conjugated diene monomer and the vinyl aromatic hydrocarbon monomer, the amount of the micro-structure modifier is preferably 0.05 to 0.5 part by weight, more preferably 0.1 to 0.4 part by weight, and even more preferably 0.2 to 0.3 part by weight. In one embodiment, the amount of the micro-structure modifier is 0.2 part by weight.

The conjugated diene monomer accounts for 74 wt % to 84 wt % and the vinyl aromatic hydrocarbon monomer accounts for 16 wt % to 26 wt % based on the total amount of the conjugated diene monomer and the vinyl aromatic hydrocarbon monomer.

The conjugated diene monomer may be 1,3-butadiene, isoprene, 1,3-pentadiene, 2-ethyl-1,3-butadiene, 2,3-dimethyl-butadiene, 2-methyl-pentadiene, 4-methyl-pentadiene, 2,4-hexadiene or a combination thereof.

The vinyl aromatic hydrocarbon monomer may be styrene, a-methylstyrene or a combination thereof.

In one embodiment, the conjugated diene monomer is 1,3-butadiene, and the vinyl aromatic hydrocarbon monomer is styrene.

Besides, the polymerization could be performed in the presence of a solvent. The solvent may include a non-polar solvent. For example, the solvent may be an aliphatic hydrocarbon such as (but not limited to) pentane, hexane, heptane or the like; an alicyclic hydrocarbon such as cyclopentane, cyclohexane, methyl cyclopentane, methyl cyclohexane or the like; an aromatic hydrocarbon such as benzene, toluene, xylene or the like, or a combination thereof.

During the step in which the modifier is added to modify the copolymer of conjugated diene and vinyl aromatic hydrocarbon, the modifier is a compound represented by formula 1,

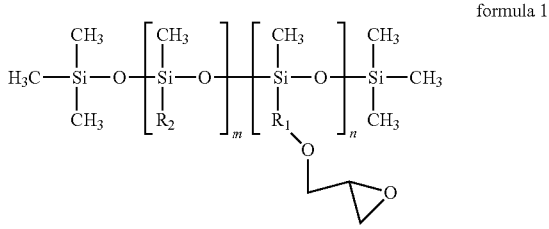

formula 1 wherein $R_1$ is a $C_2$-$C_4$ alkylene group; $R_2$ includes a $C_2$-$C_4$ alkylene group and a $C_1$-$C_3$ alkoxy group; m is an integer of 5 to 30; and n is an integer of 5 to 35. In an embodiment, $R_2$ may include the $C_2$-$C_4$ alkylene group, a (O—$C_2H_4$) group, a (O—CH($CH_3$)$CH_2$) group and the $C_1$-$C_3$ alkoxy group. In another embodiment, $R_2$ may also be —($CH_2$)$_3$—(O—$C_2H_4$)$_p$—(O—CH($CH_3$)$CH_2$)$_q$—$OR_3$, wherein $R_3$ is hydrogen or a $C_1$-$C_6$ alkyl group; and each of p and q is integer of 2 to 30.

The equivalent of the epoxy group in the modifier may be less than or equal to 5,000 g/mole, preferably less than or equal to 4,000 g/mole, and more preferably less than or equal to 3,500 g/mole.

The amount of the modifier is 0.001 to 0.8 part by weight, preferably 0.01 to 0.6 part by weight, and more preferably 0.1 to 0.5 part by weight. In one embodiment, the amount of the modifier is 0.1 to 0.3 part by weight.

The specific examples of the alkylene group as $R_1$ include ethylene, propylene, butylene, and so on. The specific examples of the alkoxy group as $R_2$ include methoxy (—$OCH_3$), ethoxy (—$OCH_2CH_3$), propoxy (—$OCH_2CH_2CH_3$), and so on. Preferably, $R_1$ is ethylene, $R_2$ includes ethyl, ethoxy, and propoxy.

Besides, the present invention provides a modified copolymer of conjugated diene and vinyl aromatic hydrocarbon formed by the following polymerization steps. First, a multifunctional vinyl benzene-based compound is reacted with an organic alkali metal compound to form a star-shaped compound with multiple active sites. Next, a conjugated diene monomer, a vinyl aromatic hydrocarbon monomer, and the star-shaped compound with multiple active sites are reacted to form a copolymer of conjugated diene and vinyl aromatic hydrocarbon, wherein a weight ratio of the conjugated diene monomer to the vinyl aromatic hydrocarbon monomer is 2:1 to 6:1. Then, the copolymer of conjugated diene and vinyl aromatic hydrocarbon is reacted with a modifier to form a modified copolymer of conjugated diene and vinyl aromatic hydrocarbon, wherein the modifier is a compound represented by the above-mentioned formula 1.

The details (including reactant selection and reactant amount) of the said polymerization steps may be the same as those described above, and thus are not iterated herein.

The synthesized modified copolymer of conjugated diene and vinyl aromatic hydrocarbon includes a conjugated diene structural unit and a vinyl aromatic hydrocarbon structural unit. Herein, the structural unit can also be called a monomeric unit, which refers to the structural unit being formed by the polymerization of a conjugated diene monomer or a vinyl aromatic hydrocarbon monomer.

The conjugated diene structural unit may include 1,3-butadiene structural unit, isoprene structural unit, 1,3-pentadiene structural unit, 2-ethyl-1,3-butadiene structural unit, 2,3-dimethyl-butadiene structural unit, 2-methyl-pentadiene structural unit, 4-methyl-pentadiene structural unit, 2,4-hexadiene structural unit or a combination thereof.

The vinyl aromatic hydrocarbon structural unit may include styrene structural unit, α-methylstyrene structural unit or a combination thereof.

In one embodiment, the conjugated diene structural unit is 1,3-butadiene structural unit, and the vinyl aromatic hydrocarbon structural unit is styrene structural unit. In one embodiment, the styrene structural unit accounts for 21 wt % and the 1,3-butadiene structural unit accounts for 79 wt % based on the total amount of the butadiene structural unit and the styrene structural unit.

In the polymerization reaction, the 1,4-polymerization and/or 1,2-polymerization of the conjugated diene monomer can be carried out to obtain a 1,4-structural unit (or 1,4-vinyl structure, the abbreviation: 1,4-structure) and/or a 1,2-structural unit (or 1,2-vinyl structure, the abbreviation: 1,2-structure). The "1,4-polymerization" refers to bonding of one conjugated diene monomer to another monomer through carbons at positions 1 and 4 of the conjugated diene monomer. The 1,4-structure obtained from this manner can be further divided into cis-structure and trans-structure. The "1,2-polymerization" refers to bonding of one conjugated diene monomer to another monomer through carbons at positions 1 and 2 of the conjugated diene monomer. The 1,2-structure obtained from 1,2-polymerization is a structure having a vinyl group at the side chain. The 1,4-structure and the 1,2-structure may co-exist in a polymer chain. For example, the polymerization of 1,3-butadiene monomer can be carried out to obtain a 1,2-butadiene structural unit and/or a 1,4-butadiene structural unit. The 1,2-structure of the modified copolymer of conjugated diene and vinyl aromatic hydrocarbon accounts for 55 wt % to 70 wt % based on the total amount of the 1,2-structure and the 1,4-structure.

In an embodiment, the weight average molecular weight of the modified copolymer of conjugated diene and vinyl aromatic hydrocarbon is 300,000 to 800,000, and preferably 400,000 to 700,000. The number average molecular weight of the modified copolymer of conjugated diene and vinyl aromatic hydrocarbon is 200,000 to 500,000, and preferably 250,000 to 400,000. The polydispersity index (PDI, or Mw/Mn) of the modified copolymer of conjugated diene and vinyl aromatic hydrocarbon is 1.3 to 2.0, and preferably 1.4 to 1.8. In one embodiment, the weight average molecular weight of the modified copolymer of conjugated diene and vinyl aromatic hydrocarbon is 550,000, the number average molecular weight thereof is 320,000, and the polydispersity index thereof is 1.65.

It should be noted that a branched copolymer of conjugated diene and vinyl aromatic hydrocarbon can be formed by adding the star-shaped compound with multiple active sites during polymerization of a conjugated diene and a vinyl aromatic hydrocarbon. Besides, the $R_2$ group and the epoxy group of the modifier are both at the side chain, which also enables formation of the highly branched modified copolymer. In comparison with a linear copolymer of conjugated diene and a vinyl aromatic hydrocarbon, the highly branched modified copolymer of conjugated diene and vinyl aromatic hydrocarbon of the present invention has better compatibility and mixing homogeneity with silica.

Besides, upon the actual requirements, various agents or additives commonly used in the field of rubber industry can be added to the rubber including the modified copolymer of conjugated diene and vinyl aromatic hydrocarbon of the present invention. In one embodiment, the examples of agents or additives include a filler, an antioxidant, a coupling agent, a vulcanization activator (vulcanization coagent/zinc oxide, stearic acid), a vulcanization accelerator, a vulcanizing agent, an antiager, a processing oil, and so on.

In one embodiment, the filler can be a silicon-containing material, such as silica. The amount of silica can be 10 to 100 phr, and preferably 20 to 90 phr. Besides, carbon black can be used together with silica. The amount of carbon black can be 2 to 100 phr, and preferably 5 to 90 phr. The suitable antioxidant may be a phenolic compound containing at least one hindered phenol, such as IX-1076 made by CIBA; a dialkylphenyl triphosphite antioxidant; an amination antioxidant selected from naphthylamines, diphenylamines, and p-phenylenediamines; or a phenol antioxidant selected from trialkyl phenols, hydroquinones and polyphenols. The amount of the antioxidant can be 0.2 to 1 phr.

The coupling agent can be, for example, bis-(3-triethoxysilylpropyl)tetrasulfide, bis-(3-triethoxysilylpropyl)disulfide, bis-(2-triethoxysilylethyl)tetrasulfide, 3-mercaptopropyltriethoxysilane, 3-triethoxysilylpropyl-N,N-dimethylthiocarbamoyl tetrasulfide, 3-triethoxysilylpropylbenzothiazole tetrasulfide or the like. The amount of the coupling agent can be 1 to 15 phr, and preferably 5 to 10 phr.

The vulcanization activator can be, for example, zinc oxide, stearic acid or the like.

The suitable vulcanization accelerator can be selected from mercaptobenzthiazoles, sulfenamides, guanidines, dithiocarbamates, thioureas and thiocarbonates. It is preferred to use sulfenamide as a vulcanization accelerator. The specific examples of the sulfenamide include cyclohexylbenzothiazolesulfenamide and/or dicyclohexylbenzothiazolesulfenamide and/or butylbenzothiazolesulfenamide. Preferably, N-cyclohexyl-2-benzothiazolesulfenamide (CBS) and diphenyl guanidine (DPG) are used as a vulcanization accelerator.

The vulcanizing agent can be sulfur or an organic sulphur provider. The amount of the vulcanization accelerator and sulfur can be 0.1 to 15 phr, and preferably 0.5 to 5 phr.

The antiager can be, for example, 6PPD (N-(1,3-dimethylbutyl)-N-phenyl-p-phenylenediamine). The amount of the antiager can be 1 to 10 phr.

The present invention provides a tire component such as a tire casing, which includes the said modified copolymer of conjugated diene and vinyl aromatic hydrocarbon.

EXAMPLES & COMPARATIVE EXAMPLES

The following examples are provided only for illustration purposes and are not construed as limiting the present invention.

Physical Properties Analysis

Dynamic Storage Modulus Difference of Elasticity (ΔE') Measurement:

ΔE' is also known as Payne Effect. The compatibility between rubber and silica becomes better as the value of ΔE' is getting smaller. The properties of the rubber are measured with a viscoelasticity measuring device (model DMA Q800, made by TA Instruments). The measuring mode is set as a stretching mode, and the measuring frequency is 20 Hz. The dynamic storage elastic modulus (E) of the rubber is measured at the temperature of 60° C. and under the deformations of 0.5% to 10%. ΔE' can be obtained by deducting the dynamic storage elastic modulus under the deformation of 10% from the dynamic storage elastic modulus under the deformation of 0.5%. The unit of ΔE' is MPa.

Tan δ (0° C.) and Tan δ (60° C.) Measurement:

The properties are measured with a viscoelasticity measuring device (model DMA Q800, made by TA Instruments). The temperature rising rate is set as 3° C. per minute when the loss tangent (Tan δ) is measured. The loss tangent is measured at the temperatures of 0° C. and 60° C. The loss tangent at 0° C. (i.e. Tan δ (0° C.)) can be regarded as simulating the tire performance on the frozen road, and the higher the Tan δ (0° C.) is, the better wet skid resistance the rubber has. The loss tangent at 60° C. (i.e. Tan δ (60° C.)) can be regarded as simulating the tire performance when speeding, and the lower the Tan δ (60° C.) is, the better rolling resistance the rubber has.

Examples 1-5 & Comparative Examples 1-7

First, 370 parts by weight of cyclohexane as a solvent is added to a reactor, and a constant temperature of 45° C. is maintained. Next, 0.2 part by weight of 2,2-ditetrahydrofurylpropane (DTHFP) as a micro-structure modifier is added to the reactor. Then, a multi-functional vinyl benzene-based compound (including 66 wt % of meta-divinylbenzene and 34 wt % of para-divinylbenzene) is added in an amount shown in Table 1 (the unit is part(s) by weight and is based on 100 parts by weight of a total amount of the conjugated diene monomer and the vinyl aromatic hydrocarbon monomer). After stirring for 10 minutes, 0.06 part by weight of n-butyl lithium as a polymerization initiator is added to the reactor. N-butyl lithium is then reacted with the multi-functional vinyl benzene-based compound to form a star-shaped compound with multiple active sites. The number of the active sites of the star-shaped compound with multiple active sites is 3.3.

Herein, the molar ratio of the micro-structure modifier to the initiator is substantially about 2:1.

Thereafter, 21 parts by weight of styrene as a first monomer and 77.5 parts by weight of butadiene as a second monomer are added to the reactor for polymerization, wherein the feeding duration is 50 minutes. After the polymerization is carried out for about 55 minutes, 1.5 parts by weight of butadiene is added thereto.

After about 15 minutes, a modifier is added to the reaction in an amount shown in Table 1 (the unit is part by weight(s) and is based on 100 parts by weight of a total amount of the conjugated diene monomer and the vinyl aromatic hydrocarbon monomer). The modifiers respectively used in the examples and the comparative examples are BY-16-876, SF-8411, SF-8413 and BY-16-760 (brand names, and are all made by Dow Corning). The modifier structures and the equivalents of the epoxy groups thereof are shown in Table 2.

The raw rubber is precipitated by alcohol (such as methanol, ethanol, or isopropanol), or the solvent is removed by water vapour, and the modified copolymer of conjugated diene and vinyl aromatic hydrocarbon is obtained after the drying process.

The 1,2-vinyl structure of the modified copolymer of conjugated diene and vinyl aromatic hydrocarbon accounts for 63 wt %, measured by the infra-red (IR) spectroscopy or nuclear magnetic resonance (NMR) spectroscopy, based on the butadiene structural unit (consisting of a 1,4 structural unit and a 1,2 structural unit). Moreover, based on the total amount of the butadiene structural unit and the styrene structural unit, the styrene structural unit accounts for about 21 wt %, and the butadiene structural unit accounts for about 79 wt %. The weight average molecular weight of the modified copolymer of conjugated diene and vinyl aromatic hydrocarbon is 550,000, the number averaged molecular weight thereof is 320,000, and the polydispersity index (PDI, or Mw/Mn) is 1.65.

Next, the rubber is made from mixing the modified copolymer of conjugated diene and vinyl aromatic hydrocarbon with the following ingredients. First, silica (brand name: 7000GR, 70 phr, 385 g), antioxidant (1 phr, 5.5 g), antiager (2 phr, 11 g), carbon black (brand name: N-234, 10 phr, 55 g), coupling agent (silane, brand name: Si-69, 5.6 phr, 30.8 g), zinc oxide (3 phr, 16.5 g), and stearic acid (2 phr, 11 g) are added and blended in the rubber composition. After the temperature is raised to 150° C., the mixture is discharged and then aged for 24 hours at room temperature. The above procedure is performed by a Banbury-type mixer. After the aging is completed, 1.8 phr of CBS, 1.7 phr of DPG, and 1.7 phr of sulfur are added to the mixture so as to obtain a rubber. The above procedure is performed by a roll-type mixer.

Ingredients information of making the rubber is as follows:
silica (made by ULTRASIL EVONIK)
antioxidant (IX-1076, made by CIBA)
Si69 (bis-(3-triethoxysilylpropyl)tetrasulfide, made by Degu-ssa AG)
zinc oxide (ZnO, made by HA)
N-cyclohexyl-2-benzothiazolesulfenamide (CBS, made by FLEXSYS)
sulfur (Triangle Brand)
stearic acid (TPSA1865, made by CV. Pacific Indochem)
antiager (N-(1,3-dimethylbutyl)-N-phenyl-p-phenylenediamine, 6PPD, made by Chaung Yi Chemical Company)
carbon black (ISAF-HS N234, made by CSRC)
diphenyl guanidine (DPG, made by FLEXSYS).

Results of the properties of rubbers in examples 1-6 and comparative examples 1-7 are shown in Table 1. In Table 1, the abbreviation "EX" refers to an example and the abbreviation "CEX" refers to a comparative example.

TABLE 1

| | | EX 1 | EX 2 | EX 3 | EX 4 | EX 5 | CEX 1 | CEX2 | CEX 3 | CEX4 | CEX5 | CEX 6 | CEX 7 |
|---|---|---|---|---|---|---|---|---|---|---|---|---|---|
| multi-functional vinyl benzene-based compound (part by weight) | | 0.05 | 0.05 | 0.05 | 0.05 | 0.05 | 0 | 0.2 | 0.05 | 0.05 | — | — | — |
| modifier | BY-16-876 (part by weight) | 0.3 | 0.2 | 0.1 | | | | | | | 0.3 | | |
| | SF-8411 (part by weight) | | | | 0.3 | | | | | | | 0.3 | |
| | SF-8413 (part by weight) | | | | | 0.3 | | | | | | | 0.3 |
| | BY-16-760 (part by weight) | | | | | | | | | 0.3 | | | |
| Physical properties | ΔE' (MPa) | 1.5 | 1.7 | 1.86 | 1.84 | 1.71 | 2.0 | Unable to conduct | 2.1 | 2.1 | 1.5 | 1.66 | 1.71 |
| | Tanδ (0° C.) | 1.37 | 1.36 | 1.36 | 1.34 | 1.36 | 1.20 | | 1.21 | 1.17 | 1.29 | 1.17 | 1.23 |
| | Tanδ (60° C.) | 0.06 | 0.06 | 0.06 | 0.65 | 0.06 | 0.08 | | 0.08 | 0.07 | 0.08 | 0.08 | 0.061 |

*Due to the excess amount of DVB in CEX 2, it will form a gel instead of forming rubber.
*Unit: part(s) by weight (based on 100 parts by weight of the total amount of the conjugated diene monomer and the vinyl aromatic hydrocarbon monomer)

TABLE 2

| Brand name | Equivalent of epoxy group | $R_2$ group structure | Structural formula |
|---|---|---|---|
| BY-16-876 | 2,800 | —$(CH_2)_3$—(O—$C_2H_4)_p$—(O—$CH(CH_3)CH_2)_q$—$OR_3$ ($R_3$ is hydrogen or a $C_1$-$C_6$ alkyl group; and each of p and q is an integer of 2 to 30) | |
| SF-8411 | 3,200 | —$(CH_2)_3$—(O—$C_2H_4)_p$—(O—$CH(CH_3)CH_2)_q$—$OR_3$ ($R_3$ is hydrogen or a $C_1$-$C_6$ alkyl group; and each of p and q is an integer of 2 to 30) | |
| SF-8413 | 3,800 | —$(CH_2)_3$—(O—$C_2H_4)_p$—(O—$CH(CH_3)CH_2)_q$—$OR_3$ ($R_3$ is hydrogen or a $C_1$-$C_6$ alkyl group; and each of p and q is an integer of 2 to 30) | |

TABLE 2-continued

| Brand name | Equivalent of epoxy group | [R₂ group] structure | Structural formula |
|---|---|---|---|
| BY-16-760 | 750 | carboxyl group —COOH | $R2-\underset{\underset{CH_3}{|}}{\overset{\overset{CH_3}{|}}{Si}}-O-\left[\underset{\underset{CH_3}{|}}{\overset{\overset{CH_3}{|}}{Si}}-O\right]_x-\underset{\underset{CH_3}{|}}{\overset{\overset{CH_3}{|}}{Si}}-R2$ |

As illustrated in comparative examples 1 and 3, the rubber made from the modified copolymer of conjugated diene and vinyl aromatic hydrocarbon, which is formed by using the multi-functional vinyl benzene-based compound but without adding any modifier, has bad performance in wet skid resistance, rolling resistance, and compatibility with silica.

As illustrated in comparative example 4, the rubber made from the modified copolymer of conjugated diene and vinyl aromatic hydrocarbon, which is formed by adding BY-16-760 modifier (with two carboxyl groups at two terminals), has bad performance both in wet skid resistance and in compatibility with silica.

As illustrated in comparative examples 5-7, the rubber made from the modified copolymer of conjugated diene and vinyl aromatic hydrocarbon, which is formed by adding the modifier provided in the invention but without using the multi-functional vinyl benzene-based compound (and therefore without using the star-shaped compound with multiple active sites), has bad performance both in wet skid resistance and in rolling resistance.

As illustrated in examples 1-5, the polymerization method of a modified copolymer of conjugated diene and vinyl aromatic hydrocarbon provided by the invention includes the following steps. First, a multi-functional vinyl benzene-based compound is reacted with an organic alkali metal compound to form a star-shaped compound with multiple active sites. Next, a conjugated diene monomer, a vinyl aromatic hydrocarbon monomer, and the star-shaped compound with multiple active sites are reacted to form a copolymer of conjugated diene and vinyl aromatic hydrocarbon. And then, the copolymer of conjugated diene and vinyl aromatic hydrocarbon is reacted with the modifier BY-16-876, SF-8411 or SF-8413 to form a modified copolymer of conjugated diene and vinyl aromatic hydrocarbon. The rubber made from the modified copolymer of conjugated diene and vinyl aromatic hydrocarbon, which is obtained by the above procedures, has better performance in wet skid resistance, rolling resistance, and compatibility with white carbon.

In view of the above, the invention provides a polymerization method of a modified copolymer of conjugated diene and vinyl aromatic hydrocarbon. In the polymerization method, a star-shaped compound with multiple active sites is used in the reaction, enabling formation of the branched copolymer of conjugated diene and vinyl aromatic hydrocarbon. Besides, the R₂ group and the epoxy group of the modifier are both at the side chain, which also enables formation of the highly branched modified copolymer. In comparison with a linear copolymer of conjugated diene and a vinyl aromatic hydrocarbon, the highly branched modified copolymer of conjugated diene and vinyl aromatic hydrocarbon of the present invention has better compatibility and mixing homogeneity with white carbon. One possible reason would be the introduction of silicon-containing groups to the side chains of the branched modified copolymer of conjugated diene and vinyl aromatic hydrocarbon during reactions, which increases the mixing homogeneity with silica. However, other mechanisms would be possible. The modified copolymer of conjugated diene and vinyl aromatic hydrocarbon of the present invention is suitable for manufacturing tires. The tired made of this modified copolymer has excellent performance in rolling resistance when speeding, and has excellent wet skid resistance on frozen road.

The present invention has been disclosed above in the preferred embodiments, but is not limited to those. It is known to persons skilled in the art that some modifications and innovations may be made without departing from the spirit and scope of the present invention. Therefore, the scope of the present invention should be defined by the following claims.

What is claimed is:

1. A polymerization method of a modified copolymer of conjugated diene and vinyl aromatic hydrocarbon, comprising:

reacting a multi-functional vinyl benzene-based compound with an organic alkali metal compound to form a star-shaped compound with multiple active sites;

reacting a conjugated diene monomer, a vinyl aromatic hydrocarbon monomer, and the star-shaped compound with multiple active sites to form a copolymer of conjugated diene and vinyl aromatic hydrocarbon, wherein a weight ratio of the conjugated diene monomer to the vinyl aromatic hydrocarbon monomer is 2:1 to 6:1; and reacting the copolymer of conjugated diene and vinyl aromatic hydrocarbon with a modifier to form a modified copolymer of conjugated diene and vinyl aromatic hydrocarbon, wherein the modifier is a compound represented by formula 1, formula 1

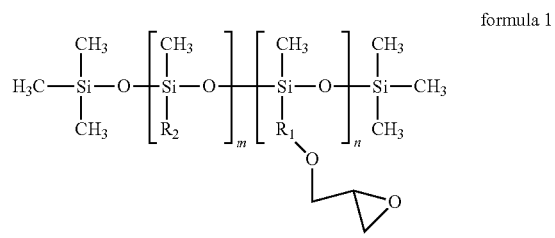

wherein R₁ is a C₂-C₄ alkylene group; R₂ comprises a C₂-C₄ alkylene group and a C₁-C₃ alkoxy group; m is an integer of 5 to 30; and n is an integer of 5 to 35, and wherein based on 100 parts by weight of a total amount of the conjugated diene monomer and the vinyl aromatic hydrocarbon monomer, an amount of the multi-functional vinyl benzene-based compound is 0.01 to 0.1 part by weight, an amount of the organic alkali metal compound is 0.001 to 0.1 part by weight, and an amount of the modifier is 0.01 to 0.8 part by weight.

2. The polymerization method of claim 1, wherein based on 100 parts by weight of the total amount of the conjugated diene monomer and the vinyl aromatic hydrocarbon monomer, the amount of the multi-functional vinyl benzene-based compound is 0.02 to 0.09 part by weight, the amount of the organic alkali metal compound is 0.005 to 0.05 part by weight, and the amount of the modifier is 0.03 to 0.6 part by weight.

3. The polymerization method of claim 2, wherein based on 100 parts by weight of the total amount of the conjugated diene monomer and the vinyl aromatic hydrocarbon monomer, the amount of the multi-functional vinyl benzene-based compound is 0.03 to 0.08 part by weight, the amount of the organic alkali metal compound is 0.01 to 0.03 part by weight, and the amount of the modifier is 0.03 to 0.6 part by weight.

4. The polymerization method of claim 1, wherein a number of the active sites of the star-shaped compound with multiple active sites is 2.0 to 4.0.

5. The polymerization method of claim 4, wherein the number of the active sites of the star-shaped compound with multiple active sites is 2.5 to 4.0.

6. The polymerization method of claim 5, wherein the number of the active sites of the star-shaped compound with multiple active sites is 3.0 to 3.8.

7. The polymerization method of claim 1, wherein the multi-functional vinyl benzene-based compound comprises 50 wt % to 80 wt % of meta-divinylbenzene and 20 wt % to 50 wt % of para-divinylbenzene.

8. The polymerization method of claim 1, further comprising adding a micro-structure modifier during the step of reacting the multi-functional vinyl benzene-based compound with the organic alkali metal compound to form the star-shaped compound with multiple active sites, wherein based on 100 parts by weight of the total amount of the conjugated diene monomer and the vinyl aromatic hydrocarbon monomer, an amount of the micro-structure modifier is 0.05 to 0.5 part by weight.

9. The polymerization method of claim 1, wherein the conjugated diene monomer accounts for 74 wt % to 84 wt % and the vinyl aromatic hydrocarbon monomer accounts for 16 wt % to 26 wt % based on the total amount of the conjugated diene monomer and the vinyl aromatic hydrocarbon monomer.

10. The polymerization method of claim 1, wherein $R_2$ comprises the $C_2$-$C_4$ alkylene group, a (O—$C_2H_4$) group, a (O—CH($CH_3$)$CH_2$) group and the $C_1$-$C_3$ alkoxy group.

11. The polymerization method of claim 1, wherein $R_2$ is —($CH_2$)$_3$—(O—$C_2H_4$)$_p$—(O—CH($CH_3$)$CH_2$)$_q$—$OR_3$, wherein $R_3$ is hydrogen or a $C_1$-$C_6$ alkyl group; and each of p and q is an integer of 2 to 30.

12. A modified copolymer of conjugated diene and vinyl aromatic hydrocarbon formed by the following polymerization steps:
reacting a multi-functional vinyl benzene-based compound with an organic alkali metal compound to form a star-shaped compound with multiple active sites;
reacting a conjugated diene monomer, a vinyl aromatic hydrocarbon monomer, and the star-shaped compound with multiple active sites to form a copolymer of conjugated diene and vinyl aromatic hydrocarbon, wherein a weight ratio of the conjugated diene monomer to the vinyl aromatic hydrocarbon monomer is 2:1 to 6:1; and
reacting the copolymer of conjugated diene and vinyl aromatic hydrocarbon with a modifier to form a modified copolymer of conjugated diene and vinyl aromatic hydrocarbon, wherein the modifier is a compound represented by formula 1,

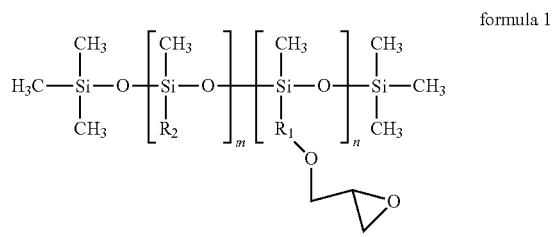

formula 1 wherein $R_1$ is a $C_2$-$C_4$ alkylene group; $R_2$ is a group comprises a $C_2$-$C_4$ alkylene group and a $C_1$-$C_3$ alkoxy group; m is an integer of 5 to 30; and n is an integer of 5 to 35, and wherein based on 100 parts by weight of a total amount of the conjugated diene monomer and the vinyl aromatic hydrocarbon monomer, an amount of the multi-functional vinyl benzene-based compound is 0.01 to 0.1 part by weight, an amount of the organic alkali metal compound is 0.001 to 0.1 part by weight, and an amount of the modifier is 0.01 to 0.8 part by weight.

13. The modified copolymer of claim 12, wherein based on 100 parts by weight of the total amount of the conjugated diene monomer and the vinyl aromatic hydrocarbon monomer, the amount of the multi-functional vinyl benzene-based compound is 0.02 to 0.09 part by weight, the amount of the organic alkali metal compound is 0.005 to 0.05 part by weight, and the amount of the modifier is 0.03 to 0.6 part by weight.

14. The modified copolymer of claim 13, wherein based on 100 parts by weight of the total amount of the conjugated diene monomer and the vinyl aromatic hydrocarbon monomer, the amount of the multi-functional vinyl benzene-based compound is 0.03 to 0.08 part by weight, the amount of the organic alkali metal compound is 0.01 to 0.03 part by weight, and the amount of the modifier is 0.03 to 0.6 part by weight.

15. The modified copolymer of claim 12, wherein a number of the active sites of the star-shaped compound with multiple active sites is 2.0 to 4.0.

16. The modified copolymer of claim 12, wherein the multi-functional vinyl benzene-based compound comprises 50 wt % to 80 wt % of meta-divinylbenzene and 20 wt % to 50 wt % of para-divinylbenzene.

17. The modified copolymer of claim 12, wherein the conjugated diene monomer accounts for 74 wt % to 84 wt % and the vinyl aromatic hydrocarbon monomer accounts for 16 wt % to 26 wt % based on the total amount of the conjugated diene monomer and the vinyl aromatic hydrocarbon monomer.

18. The modified copolymer of claim 12, wherein $R_2$ comprises the $C_2$-$C_4$ alkylene group, a (O—$C_2H_4$) group, a (O—CH($CH_3$)$CH_2$) group and the $C_1$-$C_3$ alkoxy group.

19. The modified copolymer of claim 12, wherein $R_2$ is —($CH_2$)$_3$—(O—$C_2H_4$)$_p$—(O—CH($CH_3$)$CH_2$)$_q$—$OR_3$, wherein $R_3$ is hydrogen or a $C_1$-$C_6$ alkyl group; and each of p and q is an integer of 2 to 30.

20. A tire component, comprising the modified copolymer of conjugated diene and vinyl aromatic hydrocarbon of claim 12.

* * * * *